United States Patent [19]

Heidelberg et al.

[11] Patent Number: 5,486,727

[45] Date of Patent: Jan. 23, 1996

[54] LINEAR ACCELERATOR

[75] Inventors: Götz Heidelberg, Starnberg; Peter Ehrhart, München; Gerhard Reiner, Pähl; Andreas Gründl, München, all of Germany

[73] Assignee: Magnet-Motor Gesellschaft MbH, Starnberg, Germany

[21] Appl. No.: 178,053

[22] PCT Filed: Jul. 7, 1992

[86] PCT No.: PCT/EP92/01530

§ 371 Date: Jan. 6, 1994

§ 102(e) Date: Jan. 6, 1994

[87] PCT Pub. No.: WO93/01645

PCT Pub. Date: Jan. 21, 1993

[30] Foreign Application Priority Data

Jul. 8, 1991 [DE] Germany ............... 41 22 601.1

[51] Int. Cl.⁶ ............... H02K 41/02; H01F 7/06
[52] U.S. Cl. ............... 310/12; 310/13
[58] Field of Search ............... 310/12, 13

[56] References Cited

U.S. PATENT DOCUMENTS

| | | | |
|---|---|---|---|
| 3,581,127 | 5/1971 | Warnett | 310/12 |
| 3,751,693 | 8/1973 | Gabor | 310/13 |
| 3,803,466 | 4/1974 | Starkey | 318/135 |
| 3,816,776 | 6/1974 | Chari | 310/13 |
| 4,187,453 | 2/1980 | Rough | 310/13 |
| 4,616,153 | 10/1986 | Lee | 318/687 |
| 4,795,928 | 1/1989 | Suzuki et al. | 310/13 |
| 5,077,509 | 12/1991 | Wilson | 318/439 |
| 5,270,593 | 12/1993 | Levi et al. | 310/12 |
| 5,288,956 | 2/1994 | Kadokura et al. | 187/112 |
| 5,294,850 | 3/1994 | Weh et al. | 310/313 |
| 5,302,872 | 4/1994 | Ohki et al. | 310/312 |

FOREIGN PATENT DOCUMENTS

| | | | |
|---|---|---|---|
| 0505696 | 8/1920 | France . | |
| 0022448 | 7/1921 | France . | |
| 2339200 | 8/1977 | France | G05D 3/00 |
| 2008611 | 9/1970 | Germany | 310/12 |
| 2129027 | 12/1971 | Germany | 310/12 |
| 2811445 | 9/1979 | Germany | H02K 41/02 |
| 11164459 | 7/1986 | Japan | 310/12 |
| 0044059 | 2/1987 | Japan | 310/12 |
| 9301645 | 1/1993 | WIPO | 310/12 |

*Primary Examiner*—Thomas M. Dougherty
*Attorney, Agent, or Firm*—William W. Jones

[57] ABSTRACT

A linear accelerator has at least one longitudinal stator section that defines a linear path of movement and that comprises several stator coils as well as a rotor with several rotor coils that can be accelerated along the path of movement. The stator is designed as a tubular body from the inner wall of which project coil carriers with coil conductors that are mutually offset by 90 degrees. The cavities thus formed are engaged by the rotor coils that comprise each an electrically non-conductive carrier on the sides on which are arranged meandering coil conductors. The design and arrangement of the rotor coils and stator coils allow a circular magnetic field to be generated, with the result that the rotor is axially accelerated. The rotor is supplied with current by conductor rails by a cable entrained with the rotor an/or by charge accumulation in the coils before acceleration begins.

18 Claims, 1 Drawing Sheet

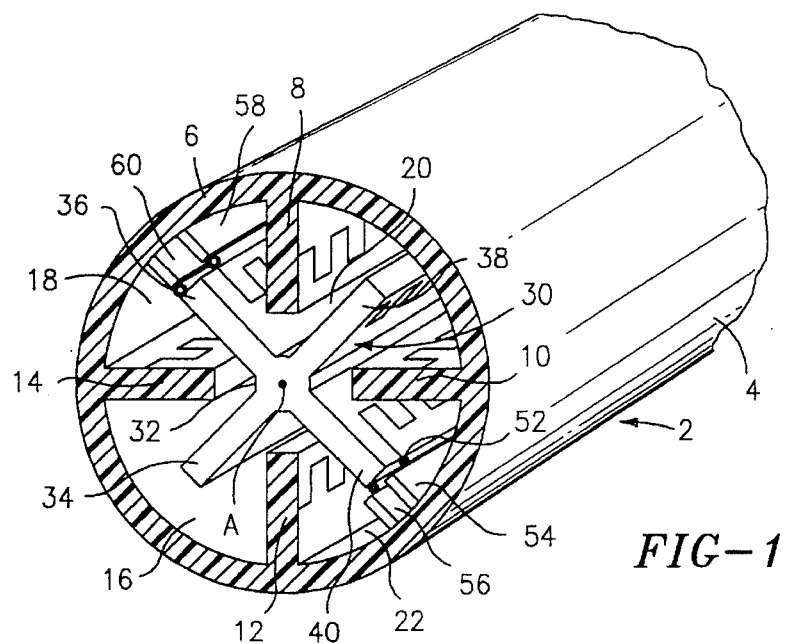
FIG-1
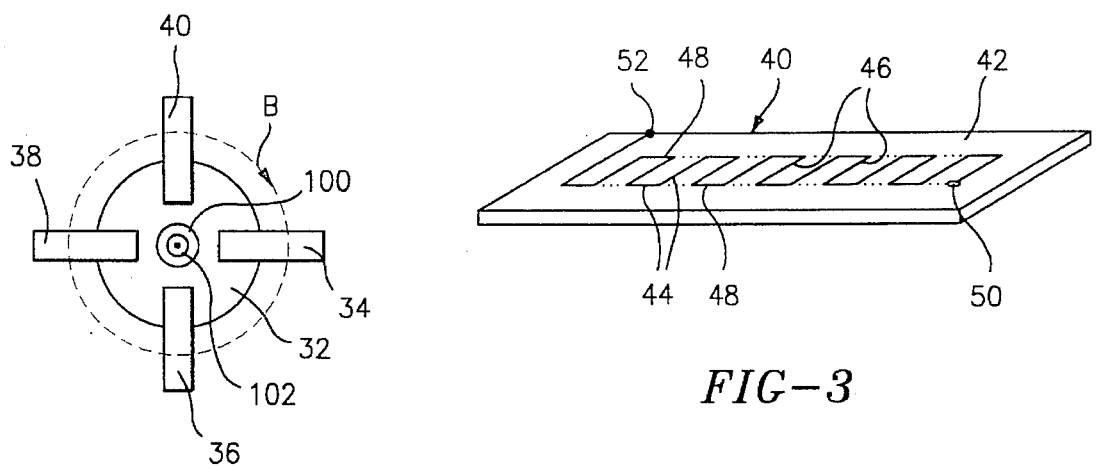
FIG-2
FIG-3
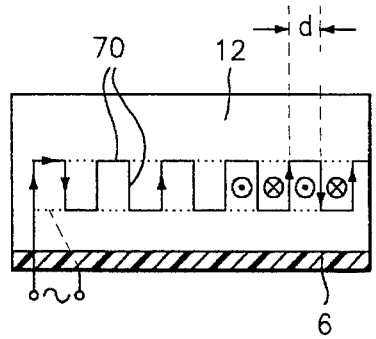
FIG-4
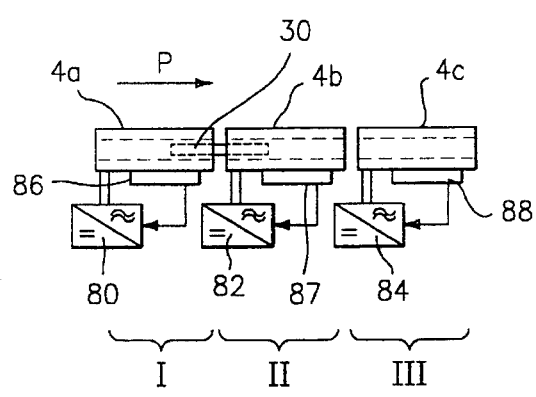
FIG-5

LINEAR ACCELERATOR

The present invention relates to a linear accelerator comprising at least one longitudinal stator portion (I, II, III; 4) defining a linear path of movement and having a plurality of stator coils (8–14, 70), and a runner (30) accelerable along the path of movement having a plurality of runner coils (34–40, 44).

Such apparatus are generally designed as linear drives. A known design is with a longitudinal stator divided into a plurality of stator portions each equipped with a separate power supply, over which a runner in the form of a wagon, slide or the like equipped with runner coils on the underside is moved. Such apparatus serve to move and position machine parts, to transport goods and the like.

The present invention is intended to provide a linear accelerator not so much for moving the runner over great paths and positioning it exactly at a certain point of the longitudinal stator portion, as for giving the runner a very strong acceleration for a relatively short path, whereby the runner has a certain mass. Along with the limited positional relation between stator and runner which is in any case necessary in the course of acceleration, what is essential is the high acceleration of the runner so that the runner mass can be used e.g. as a ram or the like, e.g. in cases where steam rams and the like have hitherto been used. Other fields of application for the linear accelerator are also possible.

Previous embodiments of linear drives are unsuitable as strict accelerators since the magnetic fields are generally produced only on one side of the stator or the runner, the result being that the magnetic fields are present to an insufficient extent relative to the runner mass, and furthermore the elements for guiding the runner along the stator portion are unsuitable for strong accelerations.

By contrast, the invention provides a linear accelerator of the abovementioned type wherein the stator coils as well as the runner coils are disposed rotationally symmetrically in a plane perpendicular to the path of movement with respect to an axis parallel to the path of movement.

The total assembly comprising stator portion and runner is of rotationally symmetric construction. The term "stator portion" here means a stator portion provided with its own power supply. A plurality of stator portions each provided with a separate power supply can accordingly be disposed along the path of movement to permit optimal regulation of the individual stator portions in accordance with the position of the runner and the acceleration present there.

The rotationally symmetric arrangement of stator portion and runner causes a very strong interaction to take place between stator and runner. This interaction can take place over the total periphery of the runner, in particular since the stator coils are aligned so as to give rise to a magnetic field surrounding the axis in rotationally symmetric fashion.

One can dispose e.g. four stator coils symmetrically about the axis, in the spaces between the four stator coils there being runner coils through which the magnetic field produced by the stator coils flows.

In contrast to known linear drives, the runner in the inventive linear accelerator is surrounded by a magnetic field which corresponds to a closed circle in the plane perpendicular to the axis. This permits considerable forces to be transmitted to the runner so that the runner undergoes very high acceleration over a very short path. The accelerated runner must involve a commutation, the commutation being adapted to the acceleration of the runner. For this purpose one commutating means or—alternatively—a plurality of commutating means working in parallel are provided per stator portion according to the invention. The electronic commutation thus takes place portion by portion or—even better—piece by piece within a stator portion. This permits the commutation to be optimally adapted to the particular acceleration of the runner at various points of the stator portion or portions. To obtain correct and optimal commutation the electronic commutating means adjust the currents in the stator and runner coils along the path of movement in accordance with the runner position which is detected by position sensors. While the runner is accelerated in the stator portion or portions the particular position of the runner is detected by the sensors. The sensors provide positional signals to the commutating means which thereupon adjust a faster commutation.

When certain parameters are given, e.g. the dimensions of the stator and the runner, maximum electric power and other parameters, the runner can only be accelerated up to a maximum value. But up to this maximum value changes in acceleration are possible. The power of the electronic commutating means is accordingly dimensioned in accordance with the power draw formed by the desired acceleration and the actual speed of the runner.

In order to stabilize, in particular center, the position of the runner within the stator portion during acceleration, the stator coils and the runner coils are formed according to the invention such that the runner is centered toward the axis upon current flow through the coils.

In a special embodiment of the invention the runner comprises a central runner body with runner coil bodies fixed detachably thereto, the latter holding the central runner body, i.e. the actual runner mass, by magnetic forces.

One can produce the stator coils and runner coils from spooled bundles of iron laminations, but it is preferable to form the stator coils and runner coils as air-core coils.

In a special embodiment these air-core coils are formed in a meander shape parallel to the direction of motion, being applied to an electrically nonconductive carrier.

One could conceivably dispose permanent magnets in the runner, but these are unsuitable for obtaining a high acceleration since they have a relatively high mass, on the one hand, and produce a relatively weak field, on the other hand. Therefore the invention provides for runner coils. To feed current into the runner coils one can dispose one or more conductor rails along the stator portion for feeding current into the runner coils via the conductor rails. Such a construction is possible within the framework of the invention, but in a special embodiment the runner coils are charged with current, i.e. excited, before and up to the beginning of acceleration and thereafter accelerated in synchronous operation. After the beginning of acceleration there is thus no more charging of the coils; with relatively low runner masses the electric energy stored in the runner coils can suffice to impart a considerable acceleration to the coils. Alternatively one can feed electric energy to the runner coils via conductor rails—as mentioned above—either throughout the acceleration process or only at the beginning of the acceleration process. For this purpose the invention provides for the runner having a hollow axle for taking up a conductor rail which transmits the excitation current to the runner coils during acceleration of the runner member, the runner being accelerated synchronously. Alternatively one could also dispose the conductor rails outside the runner.

In yet another embodiment of the invention with respect to the power supply of the runner coils, a moving supply cable is provided for the runner coils which is fed from a stationary power source. The excitation current—for the runner coils—is regulated during acceleration in accordance with a certain acceleration course with respect to length of path and/or time.

The abovementioned possibilities for feeding current into the runner coils thus include "charging" the coils before the beginning of the acceleration process and/or feeding current via conductor rails or a carried supply cable. As an embodiment, or as an independent possibility, the invention provides for asynchronous excitation of the runner coils during the acceleration process. While the actual acceleration takes place because the excited runner coils are accelerated synchronously by the stator coils, asynchronous excitation means a direct-current or pulsed excitation so that energy is pumped inductively from the stator into the runner coils. This energy pumped into the runner coils is available for forming a magnetic field. During acceleration one can regulate the current in the runner coils in accordance with the desired acceleration course by the asynchronous proportion.

With respect to the mechanical design some proposals were already made above. Specifically the invention provides for the stator coils being disposed coaxially within a pipe. One can imagine a pipe with several radial walls protruding inwardly from its inside wall—in rotationally symmetric fashion—the meandering coil wires being formed on the surfaces of the walls. The meandering conductors on both sides of the walls are—as with the runner coils—formed such that the same current directions and consequently the same magnetic field directions result at overlapping places on the front and back. One can e.g. dispose a meandering conductor in the longitudinal direction on one side of a wall or a carrier, guiding the conductor onto the back at the end of the carrier via a throughplating or via an end face of the carrier, and guiding it back there, in partial overlapping with the meandering conductor on the first side of the carrier.

So as not to prevent acceleration of the runner one can provide sliding means for low-friction guidance of the runner at the mutual points of contact, in particular on conductor rails.

In the following an embodiment example of the invention shall be explained in more detail with reference to the drawing, in which:

FIG. 1 shows a perspective view of a longitudinal stator portion cut open transverse to the longitudinal direction with the runner located therein, FIG. 2 shows a cross-sectional view of a special embodiment of a runner for a linear accelerator, FIG. 3 shows a perspective view of a runner coil, FIG. 4 shows a top view of a stator coil, and FIG. 5 shows a schematic representation of a linear accelerator with a plurality of series-connected stator portions.

Linear accelerator 2 shown in perspective in FIG. 1 contains plastic stator 4 in the form of tubular body 6 with four radial carriers 8, 10, 12 and 14 protruding toward the middle from its inside wall at equal included angular intervals. Each radial carrier 8, 10, 12 and 14 has a certain radial length and a certain thickness and is formed integrally with tubular body 6.

Between radial carriers 8, 10, 12 and 14 longitudinal cavities 16, 18, 20 and 22 are formed.

The core axis of tubular body 6 simultaneously forms axis of symmetry A of the total linear accelerator, which also defines the direction of motion of runner 30.

A runner 30 can comprise an integral plastic body, as indicated in FIG. 1. However it preferably comprises central runner body 32 shaped from plastic or metal with longitudinal slots distributed evenly over the periphery for taking up radial wings 34, 36, 38 and 40.

According to FIG. 1 radial wings 34, 36, 38 and 40 are formed integrally with the central runner body.

Radial wings 34 to 40 engage longitudinal cavities 16 to 22 of longitudinal stator 4, as apparent from FIG. 1.

FIG. 3 shows a perspective view of radial wing 40. The form of the other radial wings 34, 36 and 38 is identical to that of radial wing 40. According to FIG. 3 the radial wing forms a runner coil. The runner coil or radial wing accordingly comprises plate-shaped carrier 42 made of electrically nonconductive material with a length of about 20 cm. Meandering wire 44 is formed on the top surface shown in FIG. 3, e.g. by laminating the surface of carrier 42 and etching away the surrounding areas of wire 44.

From contact connection 52 located on the upper edge of carrier 42 meandering wire 44 goes in the longitudinal direction of carrier 42, i.e. parallel to axis A and to the path of movement, in the form of longitudinal portions 48 and transverse portions 46 as far as throughplating hole 50. On the bottom side of carrier 42 covered in FIG. 3 meandering wire 44 runs back as far as a connection on the lower edge of carrier 42 not shown in FIG. 3.

The returning meandering wire not to be seen in FIG. 3 is formed so that transverse portions 46 overlap with transverse portions 46 on the top surface of the carrier, while longitudinal portions 48 are offset by the width of the meandering wire as indicated by dots in FIG. 3.

According to FIG. 2 four runner coils of the type shown in FIG. 3 are inserted in longitudinal grooves in central runner body 32. According to FIG. 1 four runner coils of the type shown in FIG. 3 are formed integrally with a central runner body.

Sliding contact 52 on the edge as shown in FIG. 3 is disposed on the outer side of runner 30 according to FIG. 1 so that it is in sliding contact with a conductor rail protruding from the inner side of tubular body 6 of the stator. As indicated in FIG. 1 two conductor rails 54 and 56 are associated with radial wing 40 serving as a runner coil, for feeding current via sliding contact 52 shown in FIG. 3 or the sliding contact on the underside of carrier 42 covered in FIG. 3. FIG. 1 also shows two conductor rails 58 and 60 for the runner coil which is formed by radial wing 36. Conductor rails are also present for runner coils 38 and 34 but they are not shown in FIG. 1.

FIG. 2 shows a modified embodiment for the power supply. The runner of FIG. 2 has hollow axle 100 in central runner body 32 for taking up central conductor rail 102 with a plurality of strip conductors. The connections, e.g. connection 52 in FIG. 3, are connected via through holes in the central runner body with sliding contacts (not shown in the drawing) which are in contact with the strip conductors on conductor rail 102.

FIG. 4 shows the formation of a stator coil, represented here by radial carrier 12, with meandering electric wire 70 formed on each of its two sides. The step size of the meander bends is d and corresponds to the step size of the meandering conductor in the runner coils (FIG. 3).

According to FIG. 4 the meandering wire is guided from an external connection on tubular body 6 parallel to the direction of motion (axis A) over the longitudinal extent of one side surface of radial carrier 12, the particular current direction being indicated by the small arrows in FIG. 4. At the right end of radial carrier 6 the wire is guided onto the back (side covered in FIG. 4) of the radial carrier, the transverse portions of the meandering wire coinciding (overlapping) in plan view with the transverse portions on the front of the radial carrier, while the longitudinal portions are offset by the meander width as indicated by dotted lines. The current thus flows through the meandering wire on the front of the carrier in portions in the same direction as on the back. This results in lines of flux for the magnetic field as indicated in FIG. 4 by the direction of flux symbols. As is known, an X in a circle means a direction of flux away from the viewer while a dot in a circle means a direction of flux toward the viewer.

It is clear from the above description of the arrangement of the runner coils and stator coils that the structure according to FIG. 1 and FIG. 2 results altogether in circular magnetic field B, which is indicated in FIG. 2 by a broken circular line. The direction of force thus extends axially within linear accelerator 2, the force being directed according to FIG. 1 either into the plane of projection or out of the plane of projection, depending on the current direction, and the runner accelerated accordingly.

FIG. 5 shows a linear accelerator comprising three series-connected, mutually aligned longitudinal stator portions I, II and III each corresponding to stator 4 shown in FIG. 1, which is indicated by reference numbers 4a, 4b and 4c in FIG. 5.

FIG. 4 also shows inverter and commutator units 80, 82 and 84 belonging to each stator portion 4a, 4b and 4c. Sensor portions 86, 87 and 88 are also associated with stator portions 4a, 4b and 4c, respectively, optionally having a plurality of individual sensors for exactly determining the particular position of the runner. A corresponding sensor signal is fed to corresponding inverter and commutator means 80, 82 or 84.

The commutation takes place in accordance with distance d (see FIG. 4), whereby the commutation must take place at a constantly higher frequency due to the increasing runner speed.

Individual stator portions I, II and III also each have a separate power supply, formed here by an inverter and commutator means in each case. As velocity increases an ever greater amount of energy must be applied at constant acceleration since the amount of kinetic energy increases at the square of the velocity. The particular power in stator portions I, II and III is dimensioned accordingly. That is, the electric power of stator portion III is considerably higher than that in stator portion I. If an electric power of 10 kW must be applied for a force of 1000N and a velocity of 10 m/s, a power of 20 kW must be applied at the same force and twice the speed (20 m/s).

The embodiment of the runner shown in FIG. 2 offers the possibility of holding individual coil elements 34, 36, 38 and 40 magnetically within central runner body 32. The material used for the runner coils may be copper, aluminum, carbon fibers and polymer conductors, or also superconductors. The material used for the electrically nonconductive carriers (carrier 42 in FIG. 3, radial carrier 12 in FIG. 4) is preferably selected from fiber-reinforced materials, compound materials and the like.

We claim:

1. A linear accelerator comprising a longitudinal stator defining a linear path of movement and having a plurality of stator conductors; a runner accelerable along the path of movement, said runner having an plurality of runner conductors; said stator and runner conductors being disposed symmetrically about a plane perpendicular to the path of movement with respect to an axis parallel to the path of movement; and said stator conductors being formed as stator coils which are aligned so as to create a magnetic field radially surrounding said axis in symmetric fashion; and a plurality of stator components disposed along said path of movement, each of said stator components being provided with a separate power supply.

2. The linear accelerator of claim 1 wherein at least four stator coils are disposed symmetrically about said axis.

3. The linear accelerator of claim 2 wherein the runner conductors move in synchromesh within spaces formed between the stator coils, and the magnetic field produced by said stator coils flows through said runner conductors.

4. The linear accelerator of claim 1 further comprising one or more commutating means operating in parallel per stator component.

5. The linear accelerator of claim 4 wherein said commutating means adjusts electrical current in said stator coils according to runner conductor position along said path of movement.

6. The linear accelerator of claim 5 further comprising position sensors operable to detect the position of said runner conductors along said path of movement.

7. The linear accelerator of claim 4 wherein power supplied to said commutating means is varied in accordance with a power input dictated by ongoing acceleration and speed of said runner conductors.

8. The linear accelerator of claim 1 wherein said stator coils and runner conductors are disposed so that said runner is urged toward said axis during current flow.

9. The linear accelerator of claim 1 wherein said runner comprises a central runner body and runner coil bodies which are magnetically mounted on said runner body.

10. The linear accelerator of claim 1 wherein said stator coils and runner conductors comprise air-core coils.

11. The linear accelerator of claim 10 wherein said air-core coils are formed in a meandering configuration along said path of movement.

12. The linear accelerator of claim 10 wherein said air-core coils on said runner are mounted on a nonconductive carrier.

13. The linear accelerator of claim 1 wherein said runner has a hollow axle for accepting a conductor rail that transmits current to said runner conductors during acceleration of said runner.

14. The linear accelerator of claim 1 wherein said stator coils are disposed coaxially within a pipe.

15. The linear accelerator of claim 1 wherein said runner and stator are provided with low friction sliding means at points of contact for low friction guidance of said runner.

16. A linear accelerator comprising:

a) a tubular stator having an axis defining a path of movement, said stator including a plurality of carriers symmetrically disposed about the stator axis and projecting inwardly toward the stator axis, said carriers being circumferentially spaced apart to define a plurality of cavities symmetrically disposed about the stator axis;

b) a runner movably mounted within said stator, said runner including a plurality of radial wings, there being one runner wing positioned in each of said stator cavities;

c) a stator coil positioned on each of said stator carriers;

d) a runner coil positioned on each of said runner wings, said stator and runner coils when energized being operable to produce a circular magnetic field which surrounds said stator; and e) commutating means associated with said stator for accelerating said runner in at least one direction along said path of movement when said coils are energized.

17. The linear accelerator of claim 16 comprising a plurality of stators spaced apart along said path of movement, each of said stators being provided with a separate power supply, which separate power supplies will provide incrementally increased power at each stator along the path of movement.

18. The linear accelerator of claim 16 further comprising conductor rails disposed in selected ones of said stator cavities for engagement by said runner wings so as to provide guidance for said runner as the latter moves along said path of movement.

* * * * *